(12) United States Patent
Ikeda et al.

(10) Patent No.: US 6,261,719 B1
(45) Date of Patent: Jul. 17, 2001

(54) BATTERY-CONNECTING PLATE

(75) Inventors: Tomohiro Ikeda; Satoshi Saito, both of Shizuoka (JP)

(73) Assignees: Yazaki Corporation, Tokyo; Toyota Jidosha Kabushiki Kaisha, Toyota, both of (JP)

( * ) Notice: Subject to any disclaimer, the term of this patent is extended or adjusted under 35 U.S.C. 154(b) by 0 days.

(21) Appl. No.: 09/391,355

(22) Filed: Sep. 8, 1999

(30) Foreign Application Priority Data

Sep. 9, 1998 (JP) .................................................. 10-254788
Sep. 2, 1999 (JP) .................................................. 11-248398

(51) Int. Cl.[7] .................................................. H01M 4/04
(52) U.S. Cl. .............................. 429/211; 429/59; 429/83; 429/89; 429/120; 429/148; 429/156; 429/158; 429/160; 429/175; 429/177; 429/149
(58) Field of Search .................................. 429/59, 83, 89, 429/120, 148, 156, 158, 160, 175, 177, 149

(56) References Cited

U.S. PATENT DOCUMENTS 4,394,059 * 7/1983 Reynolds .............................. 339/125
5,800,942 9/1998 Hamada et al. ...................... 429/148

FOREIGN PATENT DOCUMENTS

| 0 892 450 A2 | 1/1999 | (EP) . |
| 9-120809 | 5/1997 | (JP) . |
| WO 89/00344 | 1/1989 | (WO) . |

\* cited by examiner

*Primary Examiner*—Gabrielle Brouillette
*Assistant Examiner*—Dah-Wei D. Yuan
(74) *Attorney, Agent, or Firm*—Armstrong, Westerman, Hattori, McLeland & Naughton, LLP

(57) ABSTRACT

A battery-connecting plate for connecting batteries in series. The batteries, each with a positive and a negative electrodes at opposite ends, are assembled in a row with the positive and negative electrodes reversed in an alternating manner. The battery-connecting plate includes a base plate of synthetic resin; connection portions each having a busbar provided on the base plate, the busbar having a predetermined number of holes for passing therethrough of a corresponding number of the electrodes for connection therewith; and a pitch adjusting means provided on the base plate at every predetermined number of the connection portions for adjusting a deviation in position between the electrodes and the holes of the busbars.

13 Claims, 17 Drawing Sheets

BATTERY-CONNECTING PLATE

BACKGROUND OF THE INVENTION

1. Field of the Invention

This invention relates to a battery-connecting plate, and more particularly to a battery-connecting plate for connecting an assembly of so-called rectangular batteries in series, the batteries, each with a positive and a negative electrodes at opposite end surfaces thereof, being juxtaposed with their positive and negative electrodes reversed in an alternating manner. The battery-connecting plate can connect the electrodes if there is a small difference in pitches between them, so as to facilitate the mounting of the battery-connecting plate to the batteries as well as its production.

2. Description of the Related Art

In recent years, an increasing number of electric vehicles and hybrid cars, which require a high-voltage, high-power source, have been produced as eco-friendly automobiles. For use with such automobiles, a technique has become important by which to gather a large number of small batteries in a downsized assembly.

FIG. 20 shows a conventional battery assembly 50 and a pair of front and rear battery-connecting plates 54, 55 which connect in series the positive and negative electrodes 52, 53 of the assembled rectangular batteries 51.

The rectangular batteries 51 each has the positive and negative electrodes 52, 53 in the form of a bolt (or nut) projecting at the front and rear end surfaces. The rectangular batteries 51 are held together, with their positive and negative electrodes 52, 53 reversed in an alternating manner, and wound around by a belt 56 to be fixed together.

The front battery-connecting plate 54, as shown in FIG. 21, includes a base plate 57 of synthetic resin, and one-hole busbars 58 and two-hole busbars 59 incorporated in a row arrangement in the base plate 57 by insert molding, the one-hole busbars 58 being located at the left and right ends of the base plate 57 and the two-hole busbars 59 therebetween. The "one-hole busbar" 58 herein means, as shown in FIG. 23B, a busbar provided with one electrode receiving hole 60 for passage therethrough of the above electrode 52 or 53, and the "two-hole busbar" 59 means, as shown in FIG. 23A, a busbar provided with two such holes 60. The battery-connecting plate 54 also includes an open/close cover 62 attached via hinges 61 to the upper edge of the base plate 57, which covers the base plate 57 after it is fixed with nuts 63 to the battery assembly 50 to prevent a short and the like. Denoted 64 is a resilient lock piece with a locking throughhole 64a and 65 is a corresponding lock projection.

The rear battery-connecting plate 55, as shown in FIG. 22, is of the same structure as the battery-connecting plate 54 except that it has no one-hole busbars 58, and includes a base plate 57' of synthetic resin, a row of two-hole busbars 59 incorporated in the base plate 57' by insert molding and an open/close cover 62' attached via hinges 61 to the upper edge of the base plate.

In the conventional battery assembly 50, the pitch A' between neighboring electrodes has greater tolerances toward the left and right ends of the battery assembly 50 due to a deviation in the width A between rectangular batteries 51 themselves combined with a deviation in centering the positive and negative electrodes 52, 53 on their respective batteries 51. Accordingly, with the battery-connecting plate 54, 55 of one-piece structure, its incorporated busbars 58, 59 tend to have their holes 60 deviated in position from their corresponding electrodes 52, 53, resulting in an awkward mounting of the battery-connecting plate 54, 55 to the battery assembly 50.

As a means of solving the above problem, there can be mentioned a method in which, as shown in FIG. 21, the hole 60 at one end of the front battery-connecting plate 54 is selected as a reference hole, and tolerances of the distances A', 2A', 3A' . . . nA' (n=13 in the illustrated example) from the reference hole to the holes 60 of each electrode 53, 52, 53 . . . are made as close as possible to improve the manufacturing dimensional accuracy. This, however, results in a cost increase.

As a second means, a method can be mentioned in which, as shown in FIGS. 23A and 23B, the diameter of the holes 60 of the two-hole and one-hole busbars 59, 58 is made sufficiently larger than the electrodes 52, 53. This, however, reduces the contact area with the electrodes 52, 53, possibly resulting in heat generation due to an increase in resistance and an unstable electrical connection.

As a third means, a method can be mentioned in which the rectangular batteries 51 themselves are produced with an improved accuracy in their width dimension A and the centering of their electrodes 52, 53 and their closer tolerances are maintained. This, however, also leads to a cost increase.

SUMMARY OF THE INVENTION

This invention has been accomplished to overcome the above drawbacks of the related art and an object of this invention is to provide a battery-connecting plate which, apart from the problem of improving the precision of the width dimension of the rectangular batteries themselves and of the centering of their positive and negative electrodes, absorbs a small pitch difference between electrodes of a battery assembly and can be easily mounted on the battery assembly, thereby enabling an easy production of the battery-connecting plate.

In order to attain the object, according to this invention, there is provided a battery-connecting plate for connecting batteries in series, the batteries, each with a positive and a negative electrodes at opposite ends thereof, being assembled in a row arrangement with the positive and negative electrodes reversed in an alternating manner, which comprises: a base plate of synthetic resin; connection portions each having a busbar provided on the base plate, the busbar having a predetermined number of holes for passing therethrough of a corresponding number of the positive and negative electrodes for connection with the base plate; and a pitch adjusting means provided on the base plate at every predetermined number of the connection portions for adjusting a deviation in position between the electrodes and the holes of the busbars.

Preferably, the pitch adjusting means comprises a slit provided in the base plate, the slit opening at one end thereof to one longitudinally-extending edge of the base plate, an escape hole provided in the base plate at the other end of the slit, and a resilient portion formed by that part of the base plate located at a side of the escape hole opposite the slit.

Preferably, the pitch adjusting means comprises a slit provided in the base plate to separate it into sections and a pair of hinges linking the sections at opposite longitudinally-extending edges of the base plate.

Preferably, the base plate comprises a row of subdivided base plates, the connection portions are each formed at a respective one of the subdivided base plates, and the pitch adjusting means is provided at every one of the connection portions and comprises a resilient hinge linking neighboring ones of the row of subdivided base plates.

Preferably, the resilient hinge is located at a side opposite the batteries and apart from the base plate.

Advantageously, the connection portions comprise first connection portions each having as the busbar a first busbar having two holes and a second connection portion having as the busbar a second busbar having one hole, the second connection portion being located on one side or opposite sides of the first connection portions.

Advantageously, the connection portions each further comprises a window provided in the base plate in which the respective busbar is fixedly mounted.

Advantageously, the respective busbar is fixedly mounted in the window by insert molding.

Advantageously, the battery-connecting plate further comprises a voltage detecting terminal attached with a signal line, connected to one or more desired ones of the busbars.

Preferably, the battery-connecting plate further comprises a protector trough for the signal line, the protector trough being integrally provided at a side of the base plate where the voltage detecting terminal is connected to the one or more desired ones of the busbars.

Advantageously, the battery-connecting plate further comprises a power line connected to one or more of the busbars and a wiring guide groove for the power line, the wiring guide groove being integrally provided at a side of the base plate where the voltage detecting terminal is connected to the one or more desired ones of the busbars.

Preferably, the battery-connecting plate further comprises an open/close cover integrally provided via a hinge at each section of the base plate divided by the pitch adjusting means.

Preferably, the battery-connecting plate further comprises lock means with which the cover is maintained in closed condition at the each section of the base plate.

The above and other objects, features and advantages of this invention will become apparent from the following description and the appended claims, taken in conjunction with the accompanying drawings.

DESCRIPTION OF THE PREFERRED EMBODIMENTS

Figure 20:
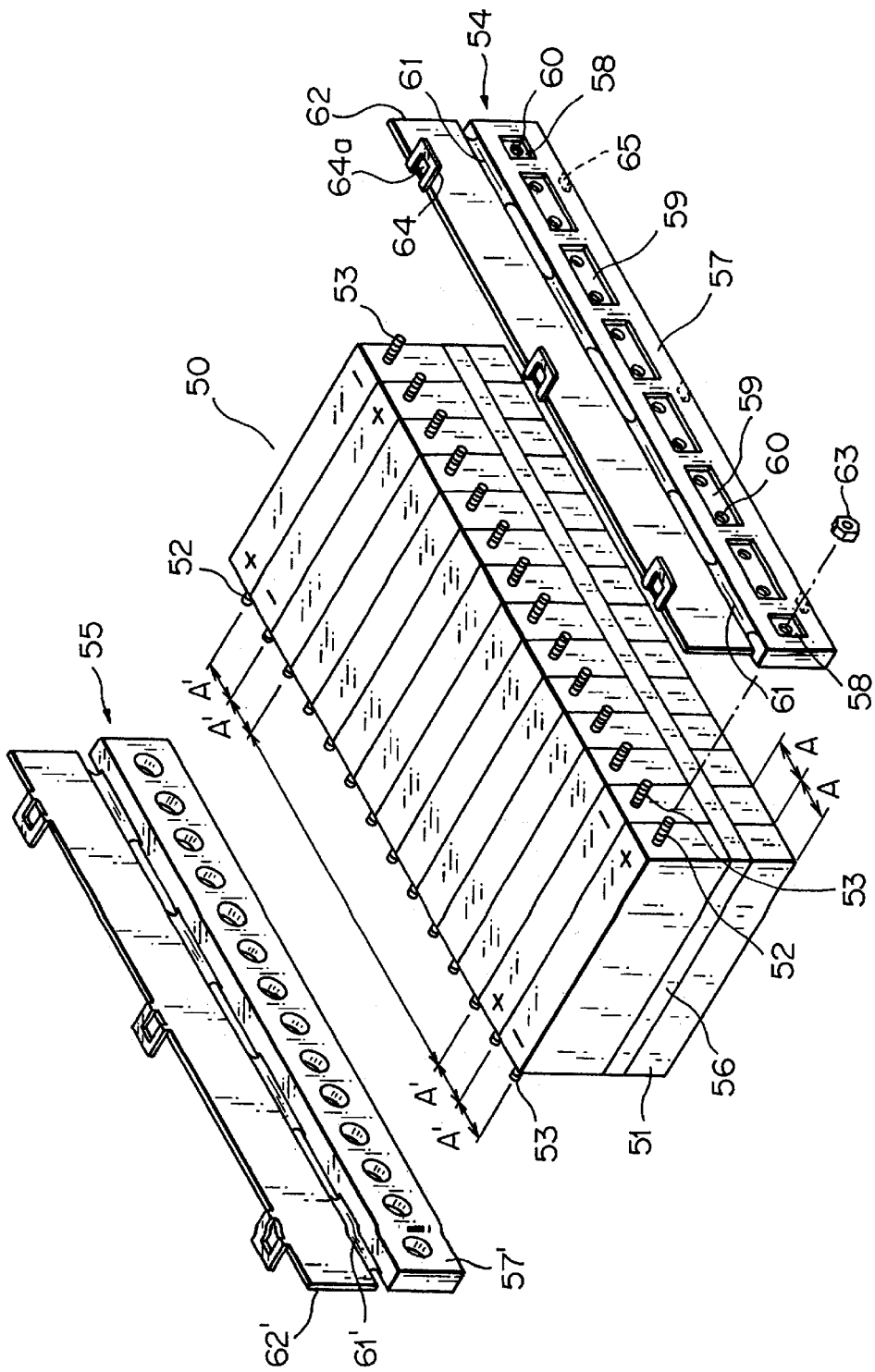
FIG. 20 is a perspective view of conventional battery-connecting plates and battery assembly, shown separated from each other.

Embodiments of this invention will now be described with reference to the attached drawings. To avoid redundancy, the conventional battery assembly, its rectangular batteries and others as shown in FIG. 20 will be used in the following description.

Figure 1:
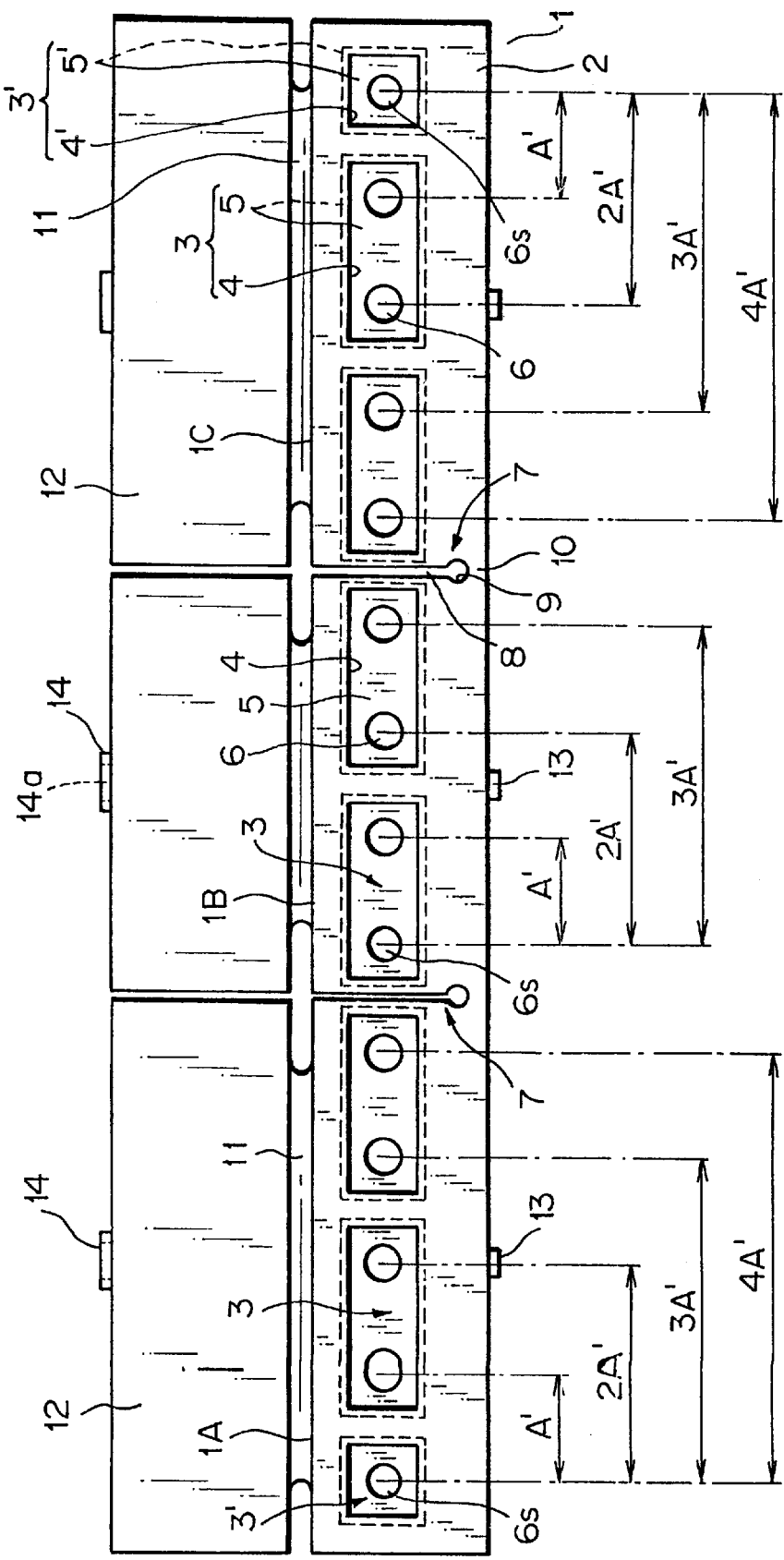
FIG. 1 is a plan view of a battery-connecting plate according to a first embodiment of this invention.

FIG. 1 shows a first embodiment of a battery-connecting plate of this invention.

In FIG. 1, denoted 1 is a front battery-connecting plate which includes a base plate 2 of synthetic resin and a plurality of connection portions 3 arranged in a row on the base plate 2. The connection portions 3 each consists of a long window 4 and a long two-hole busbar 5 embedded in the long window 4, the two-hole busbar 5 having two holes 6 for insertion therethrough of and connecting the positive and negative electrodes 52, 53 of neighboring rectangular batteries 51, 51 of the battery assembly 50. The battery-connecting plate 1 further includes, at left and right ends of the base plate 2 (on left and right sides of the connection portions 3), a connection portion 3' for connecting to an external power line or the like and consisting of a short window 4' and a short one-hole busbar 5' embedded in the short window 4' the one-hole busbar 5' having one hole 6 for insertion therethrough of the positive or negative electrode 52, 53 of the related battery.

These busbars 5, 5' are integrally provided in a fixed manner in the base plate 2 by insert molding. Incidentally, the long window 4 of the connection portion 3 may be provided in two short windows 4' insofar as the electrode-receiving holes 6 of the related busbar 5 are exposed to the outside with a space for the bolt/nut tightening operation.

Figure 15:
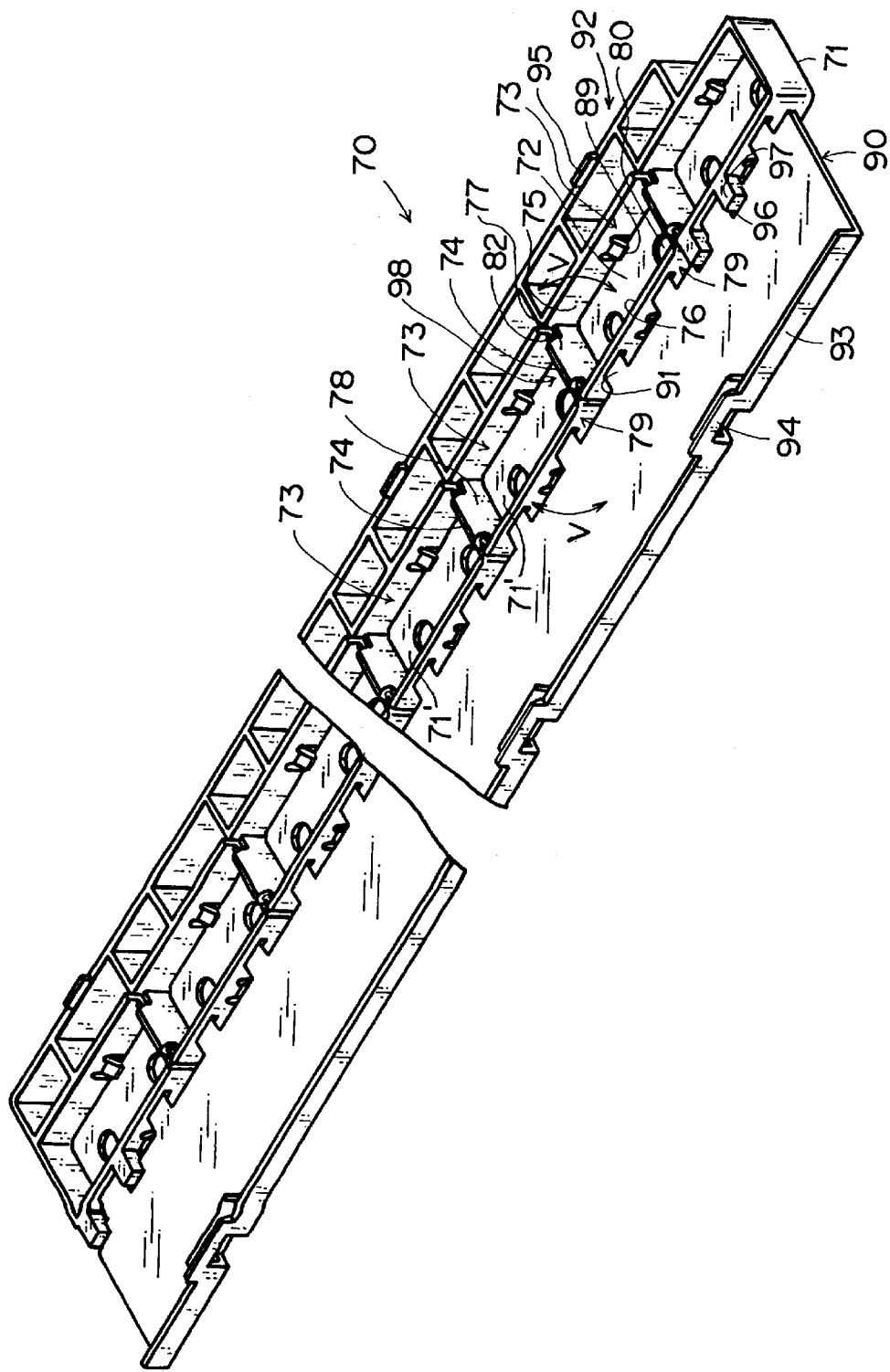
FIG. 15 is a perspective view of a battery-connecting plate according to a fourth embodiment of this invention.

The battery-connecting plate 1, so far as described above, is the same in structure as the conventional battery-connecting plate 54 in FIG. 15, but differs in that it is provided at every predetermined number of connection portions 3 (or long windows 4) with a pitch adjusting means 7.

The pitch adjusting means 7 is for adjusting a deviation in pitches between the holes 6 of the busbars 5 and includes a slit 8 opening at one edge of the base plate 2 and extending perpendicularly to its longitudinal direction, an escape hole 9 formed at the other end of the slit, and a resilient portion 10 formed by that part of the base plate 2 located at a side of the escape hole 9 opposite the slit 8. The escape hole 9 preferably has a diameter sufficiently larger than the width of the slit 8.

In the illustrated example, the pitch adjusting means 7 is provided at every two connection portions 3, with the outermost connection portions 3'0 left out of account, and thus two of the adjusting means 7 are provided.

The base plate 2 is thus divided into three sections 1A, 1B and 1C by the two pitch adjusting means 7. The neighboring sections 1A, 1B; 1B, 1C, as shown at the double-headed arrow R in FIG. 2, can therefore be bent, or opened or closed at the resilient portion 10 to move left and right relative to the slit 8.

An open/close cover 12 is joined via a hinge 11 to the base plate 2 at each section 1A, 1B, 1C. The base plate 12 has a lock projection 13 at each section 1A, 1B, 1C and each cover 12 has a resilient lock piece 14 with a lock hole 14a corresponding to the related lock projection 13.

Of the holes 6 of the busbars 5, 5' in each section 1A, 1B, 1C, the end hole designated at 6s is preferably formed as a reference hole, i.e., as a hole having such a reduced diameter as to fit snugly on the related electrode 52 or 53, so as to bring the remaining holes 6 of each section 1A, 1B, 1C automatically in alignment with their corresponding electrodes 52, 53.

In the structure as mentioned above, if there is a deviation in pitches between the holes 6 in each section 1A, 1B, 1C, such a deviation will be absorbed through the pitch-adjusting means 7, more specifically, through the slits 8 and the resilient portions 10.

Figure 2:
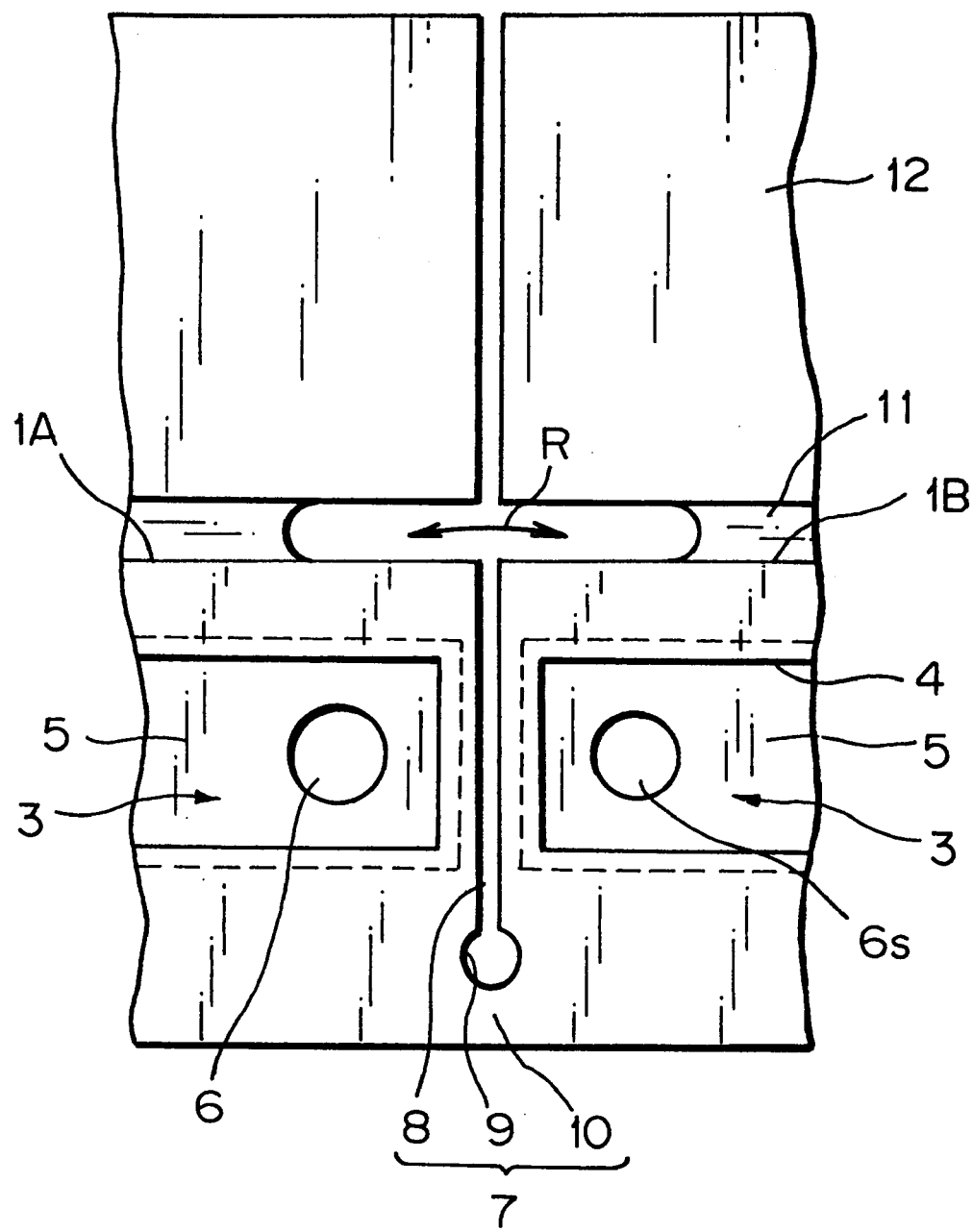
FIG. 2 is an enlarged explanatory view of a slit portion of the plate in FIG. 1.
Figure 21:
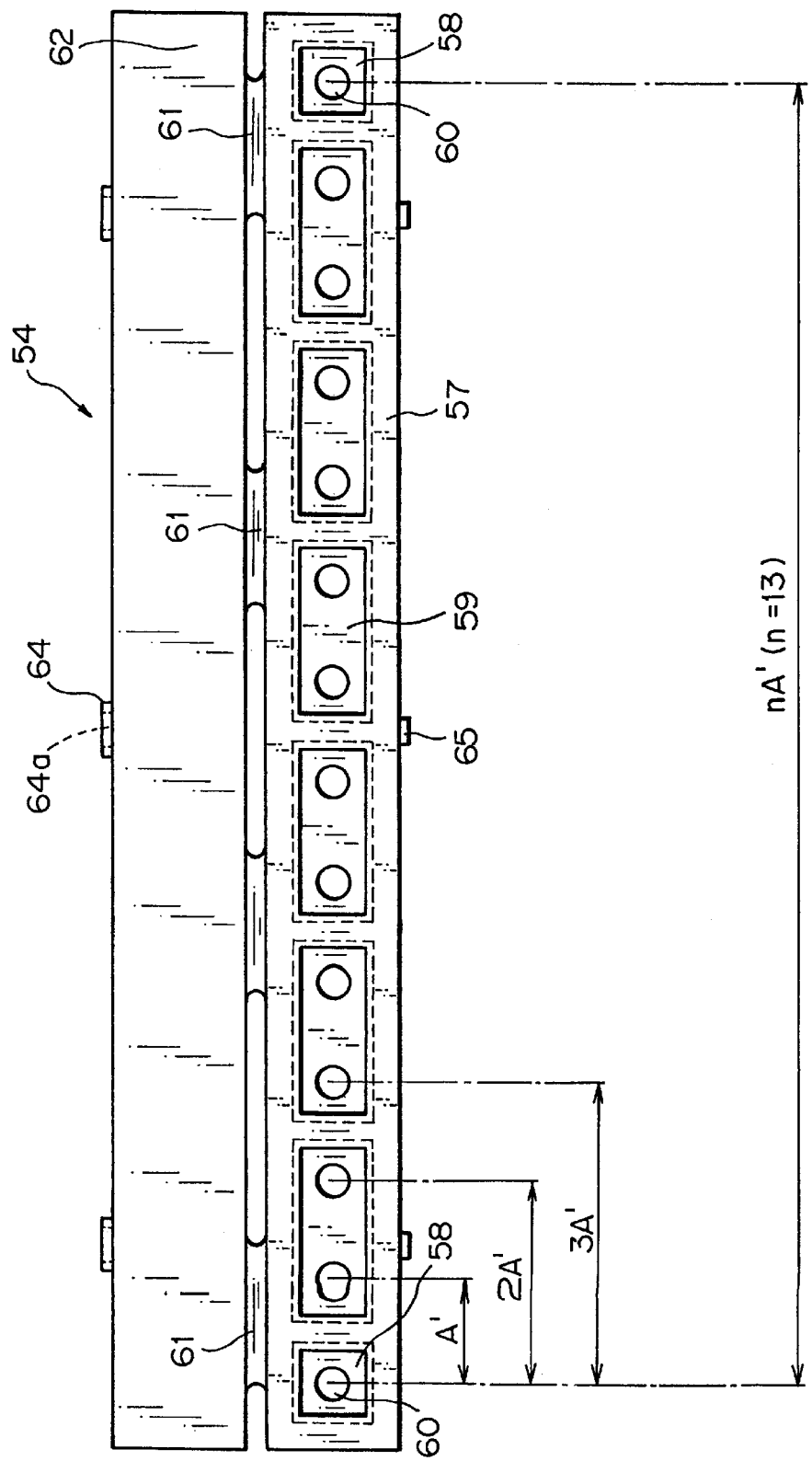
FIG. 21 is a plan view of one of the battery-connecting plates in FIG. 20.
Figure 22:
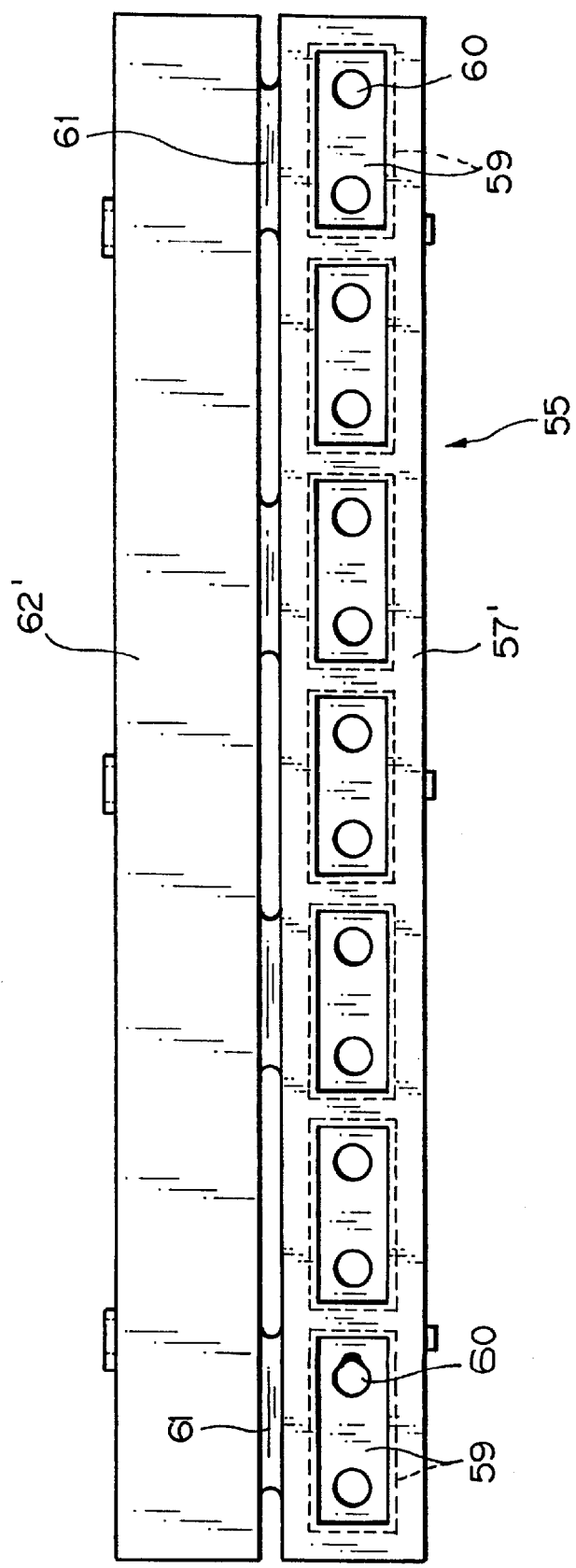
FIG. 22 is a plan view of the other battery-connecting plate in FIG. 20.
Figure 23A:
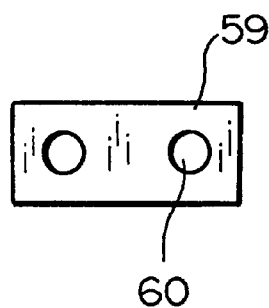
FIGS. 23A and 23B are plan views of busbars used with the one battery-connecting plate in FIG. 21, FIG. 23A showing a two-hole busbar and FIG. 23B showing a one-hole busbar.
Figure 23B:
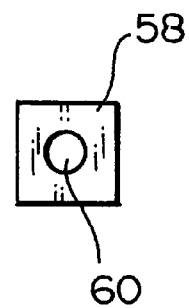

The dimensional tolerances for the battery-connecting plate 54 to be mounted and fastened with screws to the battery assembly 50, as shown in FIG. 21, conventionally consist of the maximum dimensional tolerances for 13 batteries plus the maximum distance tolerances for 13A' of the battery-connecting plate 54. In the example of this invention as shown in FIGS. 1 and 2, the dimensional tolerances will be the maximum dimensional tolerances for 4 batteries plus the maximum distance tolerances for 4A' of the battery-connecting plate 1.

In other words, by the provision of two pitch adjusting means 7 on the base plate 2 of the battery-connecting plate 1, the following are obtained as compared with the conventional case:

1) the cumulative dimension of the rectangular batteries 51 is less than one third, i.e., reduced from 13 to 4; and
2) the maximum managed length of the battery-connecting plate 1 is below one third.

As a result, according to this invention, along with the loosening of the dimensional tolerances of the width A of the rectangular batteries 51 and of the battery-connecting plate 1, it has been made possible to reduce the diameter of the holes of the busbars 5, 5'.

Figure 3:
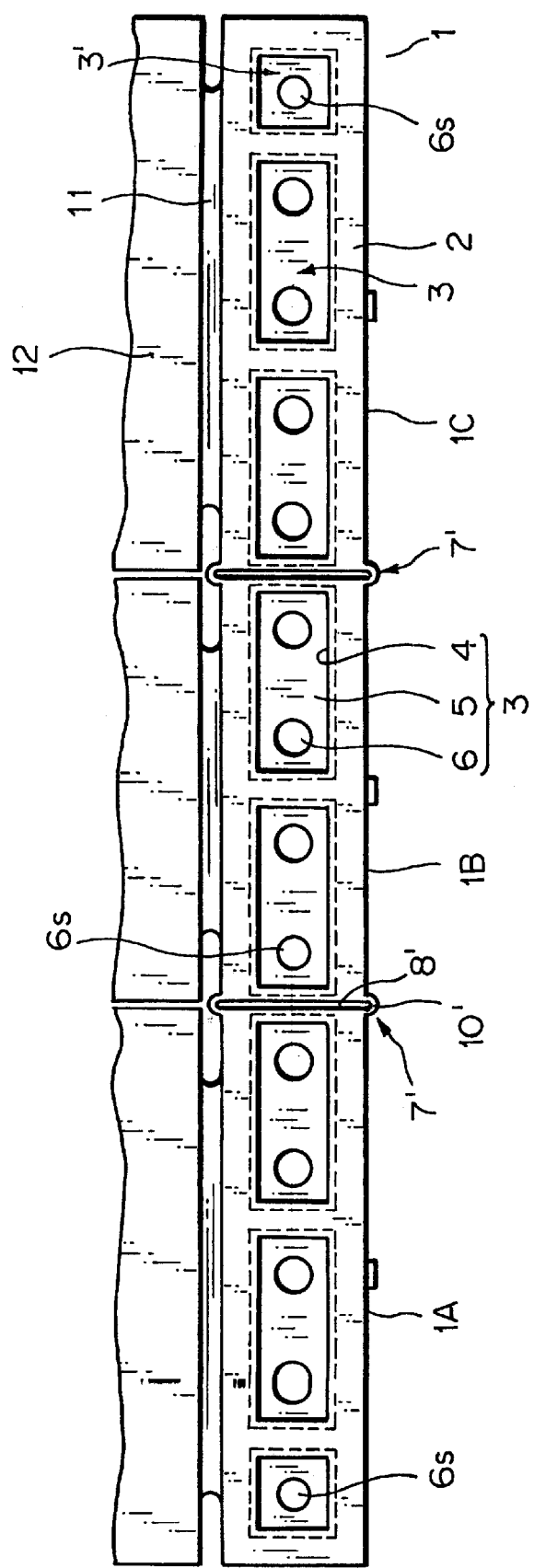
FIG. 3 is a plan view of a battery-connecting plate according to a second embodiment of this invention.

FIG. 3 shows a second embodiment of a battery-connecting plate according to this invention, in which the pitch adjusting means 7' includes a slit 8' fully dividing or splitting the base plate 2 into the sections 1A and 1B, and 1B and 1C, and a substantially U-shaped or arcuate thin hinge-like resilient portion 10' linking neighboring sections 1A, 1B and 1B at opposite ends of the slit 8'.

In this case, because the sections 1A and 1B, and 1B and 1C are linked at both upper and lower sides thereof by the resilient portions 10', 10', unlike the case of FIG. 1, one of the neighboring sections 1A, 1B, 1C will not excessively open or hang down relative to the other, thereby leading to an easy handling.

Figure 4:
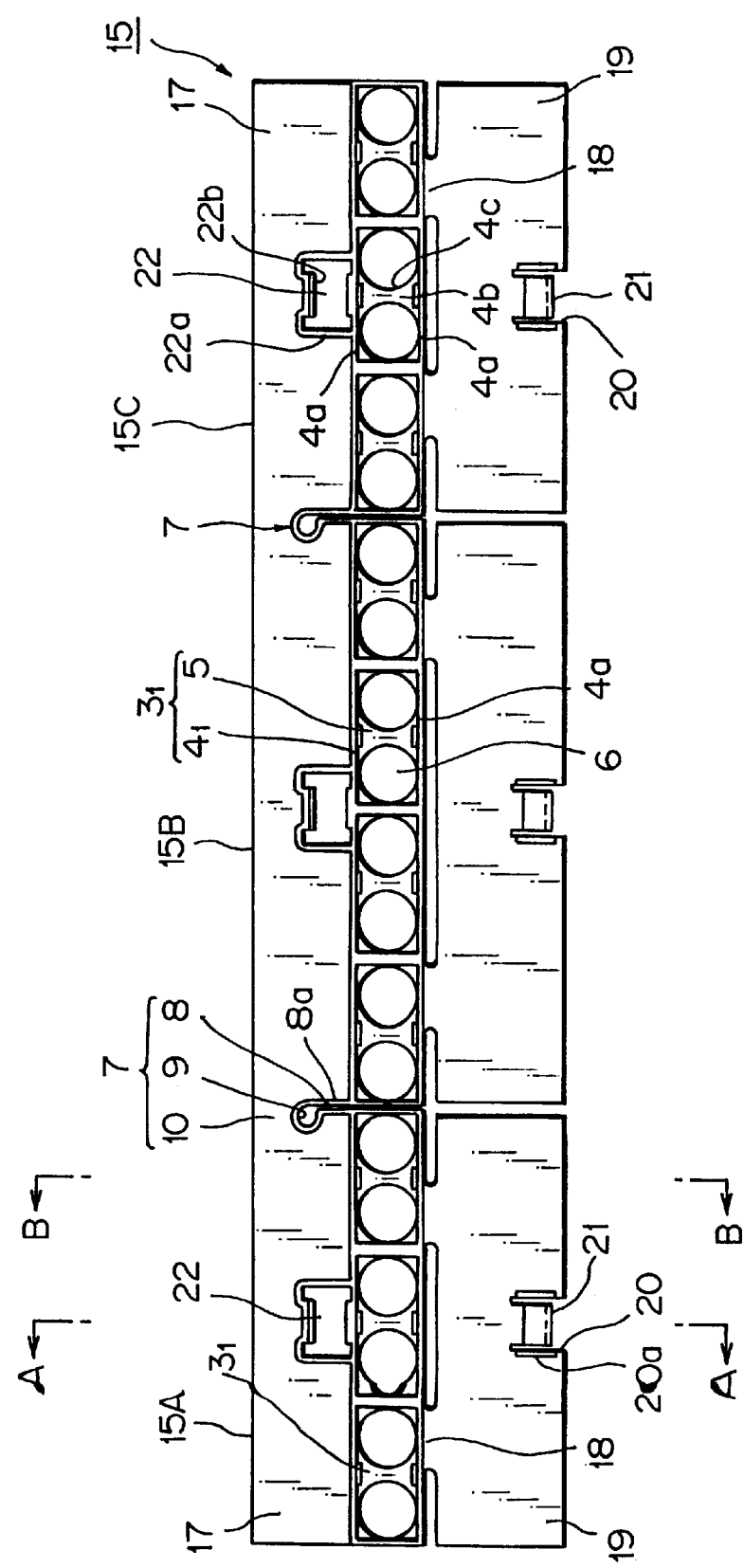
FIG. 4 is a plan view of a rear battery-connecting plate according to a third embodiment of this invention.
Figure 5:
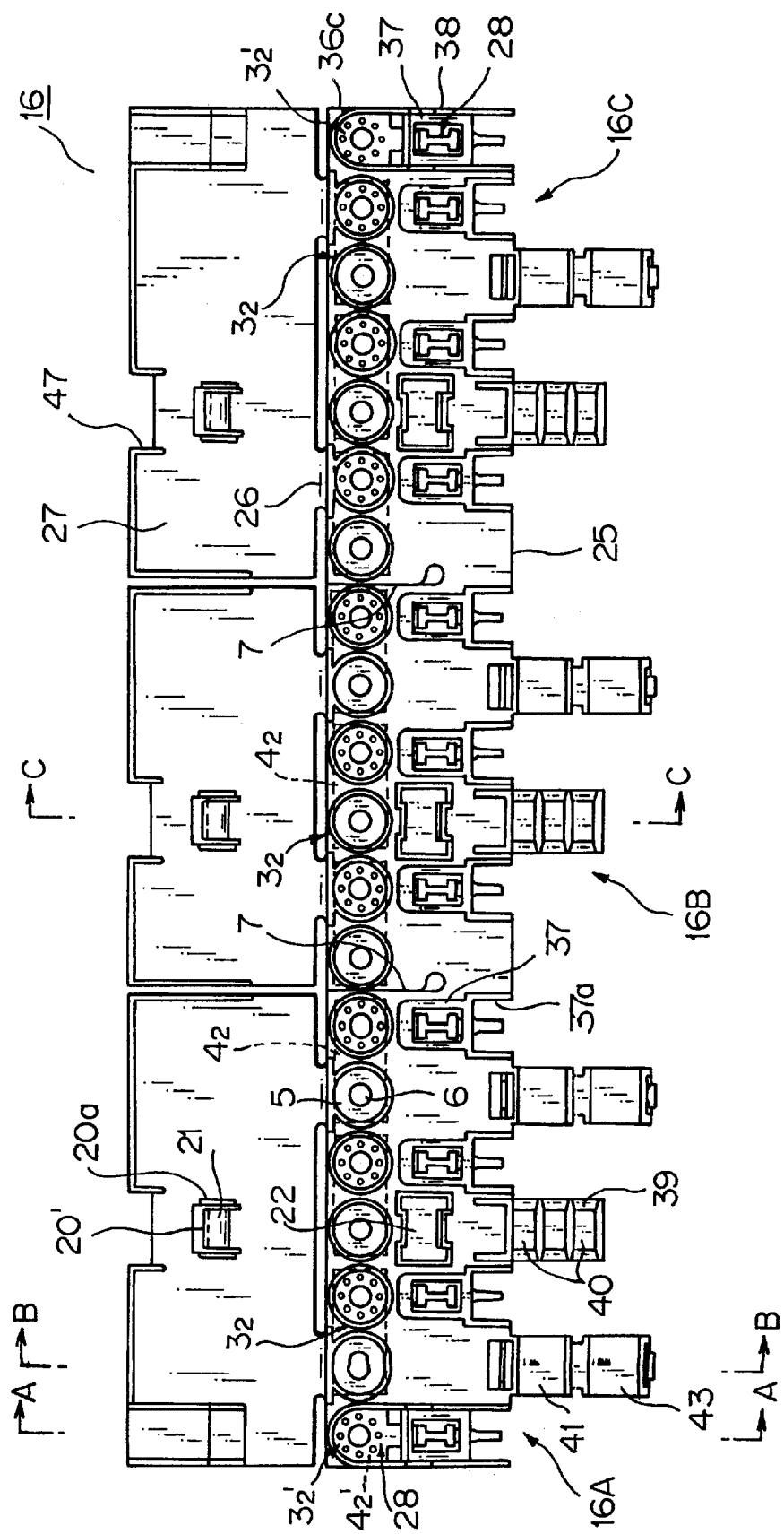
FIG. 5 is a plan view of a front battery-connecting plate used in a pair with the rear battery-connecting plate of FIG. 4.
Figure 6:
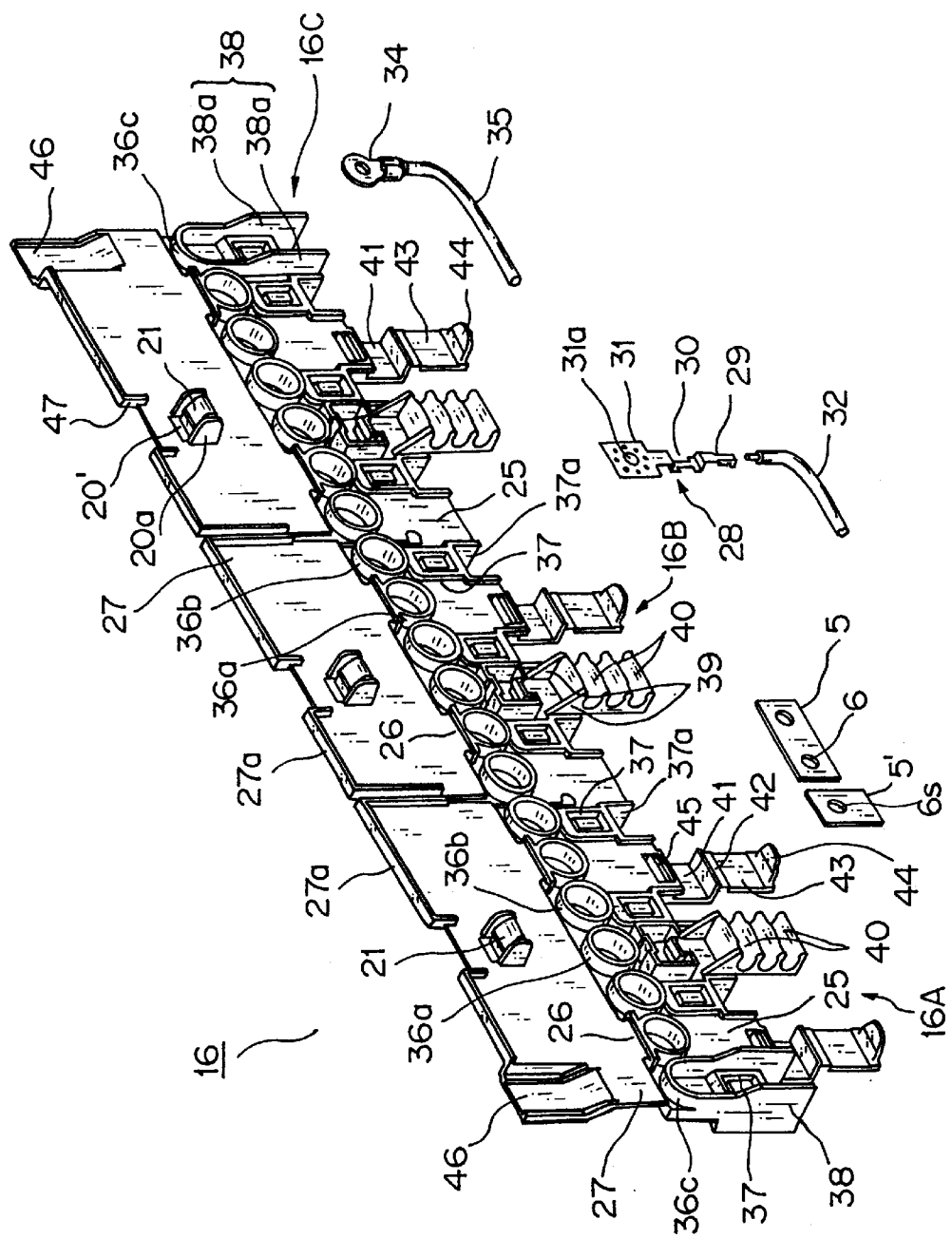
FIG. 6 is a perspective view of the battery-connecting plate of FIG. 5.

FIG. 4 is a plan view of a rear battery-connecting plate 15 according to a third embodiment of this invention, FIG. 5 is a plan view of a corresponding front battery-connecting plate 16, and FIG. 6 is a perspective view of the plate 16.

The pair of battery-connecting plates 15, 16 are adapted to be mounted to a battery assembly 50 of twenty rectangular batteries 51.

The rear battery-connecting plate 15 includes a base plate 17 of synthetic resin and a row of connection portions $3_1$ located along one longitudinal edge of the base plate 17. There is provided a pitch adjusting means 7 between the third and fourth connection portions $3_1$ both from the left and right ends of the base plate 17. The three sections 15A, 15B and 15C with six, eight and six electrode receiving holes 6 are provided with respective open/close covers 19 via hinges 18. Each connection portion $3_1$ consists of a long window $4_1$ and a two-hole busbar 5 received in the window $4_1$. Each pitch adjusting means 7 is made up of a one-end opened slit 8, a substantially circular escape hole 9 formed at the other end of the slit, and a resilient portion 10 formed by that portion of the base plate 17 at a side of the escape hole 9 opposite the slit 8.

The rear battery-connecting plate 15, so far as described above, is the same in structure as the front battery-connecting plate 1 of FIG. 1, but differs in that it is made as thin as possible and provided around each long window $4_1$ with a reinforcing rib or window frame 4a and around each slit 8 with a reinforcing rib or protector edge 8a, so as to make a reduction in the entire weight while securing a required strength.

Figure 7:
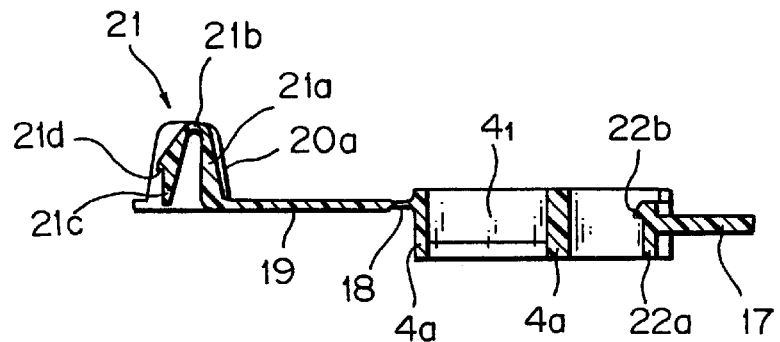
FIG. 7 is an enlarged sectional view taken along the line A—A of FIG. 4.

Each cover 19 has a cutout 20 at the center of its longitudinal edge opposite the side where the hinges 18 are provided, inside which is provided a resilient lock arm 21 projecting toward the base plate 17. The base plate 17 is provided with lock holes 22, each engageable with the related lock arm 21. The cutout 20 is provided at opposite sides thereof with projecting protector walls 20a for the resilient lock arm 21. The resilient lock arm 21, as shown in FIG. 7, is generally of U- or V-shaped section and consists of a support piece 21a rising from the base plate 17 and a resilient piece 21c extending via a curved portion 21b from the support piece 21a toward the base plate 17, the resilient piece 21c having a lock projection 21d at its front side. The lock hole 22, which receives the resilient lock arm 21, has on its rib-like reinforcing wall 22a a detent 22b engageable with the lock projection 21d.

Figure 8:
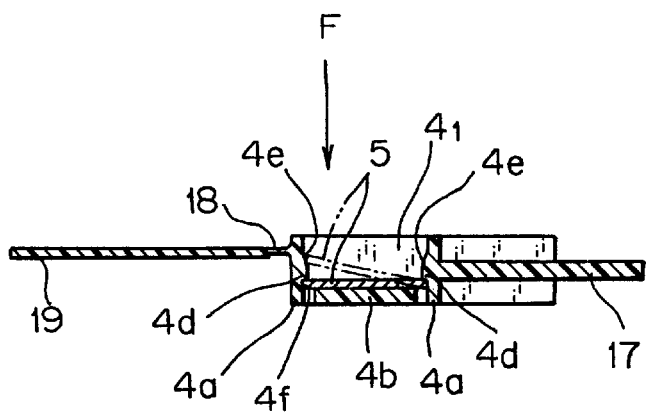
FIG. 8 is an enlarged sectional view taken along the line B—B of FIG. 4.

The long window $4_1$ constituting the connection portion $3_1$, as shown in FIG. 8, has opposed longitudinal window frames 4a (FIG. 4) and a bottom portion 4b, the bottom portion being provided with two longitudinally-arranged holes 4c (FIG. 4) larger than the holes 6 of the two-hole busbar 5. The opposed window frames 4a have on their inner surfaces lock claws 4d for the busbar 5, which have inwardly-sloping surfaces 4e for guiding insertion of the busbar 5. Between the lock claws 4d and the bottom portion 4b are formed busbar-fitting grooves 4f.

With the structure as mentioned above, the two-hole busbar 5 can be easily fixed in the long window 4₁. In other words, as shown at two-dotted lines in FIG. 8, by placing one side of the busbar 5 into one of the busbar-fitting grooves 4f and then pressing down the busbar 5 in the direction of the arrow F, the busbar 5 at the other side slides on the corresponding inwardly-sloping surface 4e, while elastically expanding the surface 4e, until it rides thereover and fits in the busbar-fitting groove 4f therebelow.

The front battery-connecting plate 16, as shown in FIGS. 5 and 6, includes a base plate 25, connection portions 32, each at a long window 4₁, provided in a row arrangement along one longitudinal edge of the base plate 25, and connection portions 3₂', each at a short window 4₂', provided on the left and right sides of the row of connection portions 3₂. The pitch adjusting means 7 is provided between the third and fourth connection portions 3₂ both from the left and right ends of the base plate 25, so as to divide the base plate into three sections 16A, 16B and 16C with seven, six and seven electrode receiving holes 6, respectively. To the base plate 25 at each section 16A, 16B, 16C is provided via hinges 26 an open/close cover 27.

Each cover 27 is formed at a central portion thereof with a resilient lock arm 21, and the base plate 25 is provided at each section 16A, 16B, 16C with a corresponding lock hole 22.

The front battery-connecting plate 16, so far as described above, is the same in structure as the rear battery-connecting plate 15, but differs in that it enables an easy and safe connection of a voltage detecting terminal 28 and a for-power-line round terminal 34 to the connection portions 3₂ and 3₂'.

Figure 12:
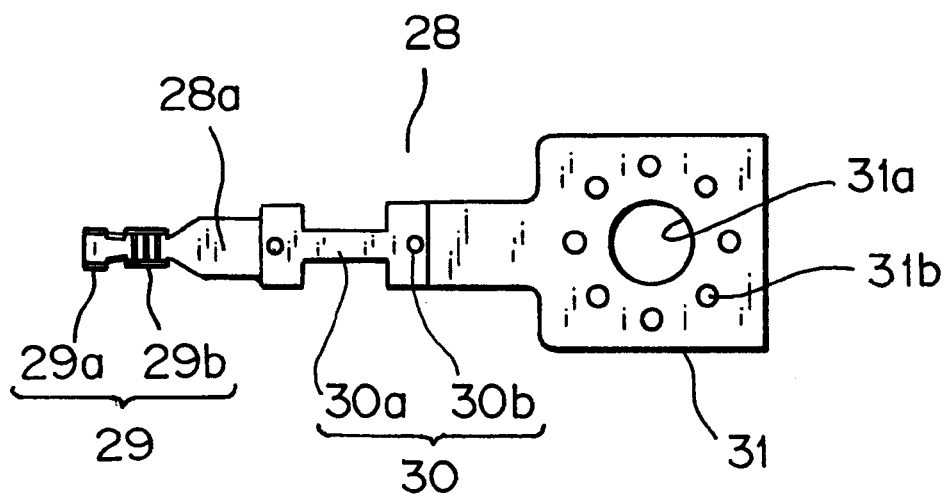
FIG. 12 is an enlarged plan view of a voltage detecting terminal in FIG. 5.
Figure 13:
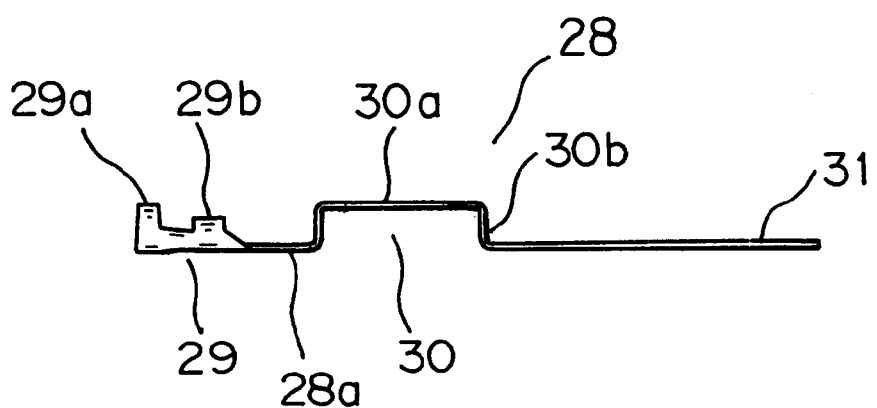
FIG. 13 is a side view of the voltage detecting terminal of FIG. 12.

The voltage detecting terminal 28, as shown in FIGS. 12 and 13, consists of a base plate 28a, a wire connecting portion 29 at one end of the base plate 28a, an electrical contact portion 31, and a circuit protector element connecting portion 30 which links the base plate 28a and the electrical contact portion 31, and is formed by pressing and bending a conductive metallic plate.

The wire connecting portion 29 has a signal line 32 (FIG. 6) connected thereto with a pair of insulator holding pieces 29a and a pair of conductor holding pieces 29b crimped thereon. The circuit protector element connecting portion 30, which is bent in a crank-like manner, includes a small-width link piece 30a which is later to be cut and a pair of lead insertion holes 30b, 30b formed in the large-width portions at opposite ends of the link piece 30a. The electrical contact portion 31 consists of a plate superimposed on and connected to the busbar 5 or 5', the plate having a central hole 31a of the same diameter as the hole 6 and a plurality of resin leakage checking holes 31b surrounding the central hole 31a.

As the round terminal 34 (FIG. 6), one which is commercially available may be used, and as the power line 35 connected to the round terminal 34, an insulatingly covered wire of nominal cross section of, for example, 12 mm² is used.

Reverting to FIGS. 5 and 6, a pair of circular window frames 36a, 36b are juxtaposed at each of the long windows 4₂ arranged along one longitudinal edge of the base plate 25, on the front surface side on which the open/close cover 27 closes, the circular window frames 36a, 36b having a size sufficiently larger than the holes 6 of the two-hole busbar 5. Adjacent one of the circular window frames 36b is formed a circuit protector element mount frame 37 which is provided through the base plate 25. On the side of the circuit protector element mount frame 37 opposite the circular window frame 36b is formed a cutout 37a for drawing out the signal line 32, which opens to the other longitudinal edge of the base plate 25.

Likewise, at each of the short windows 4₂' at the left and right ends of the base plate 25 is provided a semi-circular or U-shaped window frame 36c on the front surface side of the base plate 25, the window frame having a size sufficiently larger than the hole 6 of the one-hole busbar 5' (FIG. 1). The window frame 36c has opposed skirts extended toward the above other longitudinal edge of the base plate 25 (FIG. 6) by a pair of opposed higher parallel walls 38a, 38a which define a power line wiring groove 38 (FIG. 5). The circuit protector element mount frame 37 is also provided inside the power line wiring groove 38, i.e., between the pair of parallel walls 38a, 38a.

Figure 11:
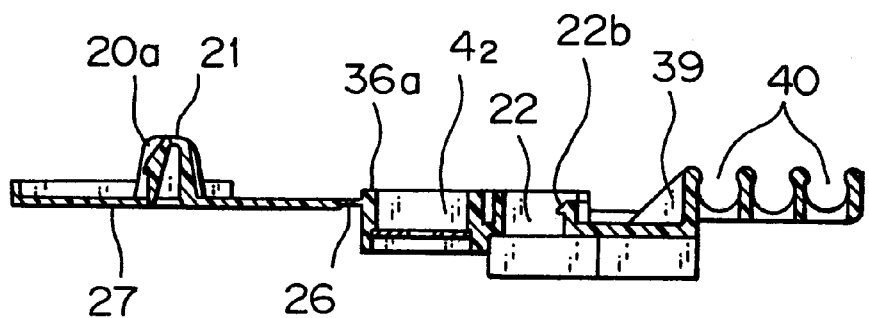
FIG. 11 is an enlarged sectional view taken along the line C—C of FIG. 5.

Wiring guide grooves 40 for the power lines 35 are integrally provided (FIG. 11) at the other longitudinal edge of the base plate 25. In other words, wiring guide grooves 40 (three in the illustrated example) are juxtaposed through a pair of brackets 39, 39 which, at a level one step higher than the front surface of the base plate 25, extend perpendicularly from the other longitudinal edge of the base plate 25 at each section 16A, 16B and 16C.

Further, a protector trough 41 for the signal lines 32 is provided (FIG. 10) at each section 16A, 16B and 16C of the base plate 25. The protector trough 41 is provided, in the vicinity of the cutout 37a, along the above other longitudinal edge at a level one step lower than the front surface of the base plate 25. An open/close cover 43 is integrally attached via a hinge 42 to the protector trough 41, the cover having at its free end a lock piece 44 with a lock projection 44a (FIG. 10) engageable with a lock hole 45 with a lock groove 45a provided in the base plate 25.

The covers 27 for the left and right sections 16A and 16C are provided with respective bulgedly formed cap portions 46 (FIG. 6) for the power line wiring grooves 38. Each cover 27 for the section 16A, 16B, 16C has a fingering cutout 47 at a center of its free end and reinforcement ribs 27a extending from the cutout 47 to its left and right side edges. Of the holes of the busbars 5', 5 in each section 16A–16C, the end hole is formed as a reference hole 6s as in the case of FIG. 1.

The production of the front battery-connecting plate 16 will now be described.

The battery-connecting plate 16 is integrally formed by insert molding the base plate 25 and the covers 27 for the respective sections 16A–16C of the base plate, along with the two-hole busbars 5 and one-hole busbars 5' as necessary.

The voltage detecting terminals 28 (FIG. 12), each connected at its wire connecting portion 29 with the signal line 32 through crimping or the like, are first set in one of not-shown upper and lower dies, and the busbar 5 or 5' are superimposed on their electrical contact portions 31, with the holes 31a and 6 aligned, followed by closing the upper and lower dies.

Figure 9:
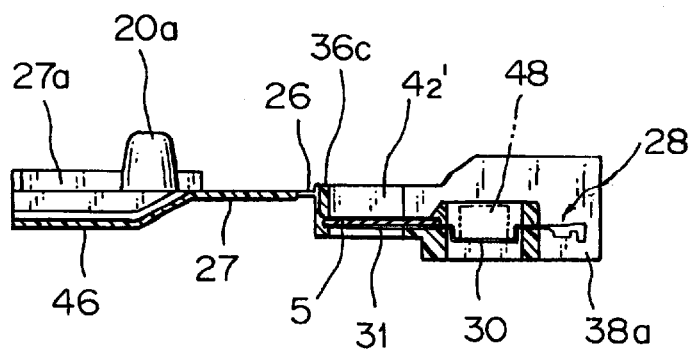
FIG. 9 is an enlarged sectional view taken along the line A—A of FIG. 5.

Resin is then injected into the dies and set such that, as shown in FIG. 9, the electrical contact portion 31 of each terminal 28 is located at the bottom side of the U-shaped window frame 36c of the related short window 4₂' (or of the circular window frame 36b of the long window 4₂), the crank-bent circuit protector element connecting portion 30 is located at the lower end of the circuit protector element mount frame 37, and the signal line 32 attached to the wire connecting portion 29 is located in the wire drawing-out cutout 37a.

If, during the insert molding, resin penetrates between the busbar 5 or 5' and the superimposed electrical contact portion 31 of the terminal 28, it comes out through the resin checking holes 31b, thereby to enable a contact failure to be easily checked from outside.

Figure 10:
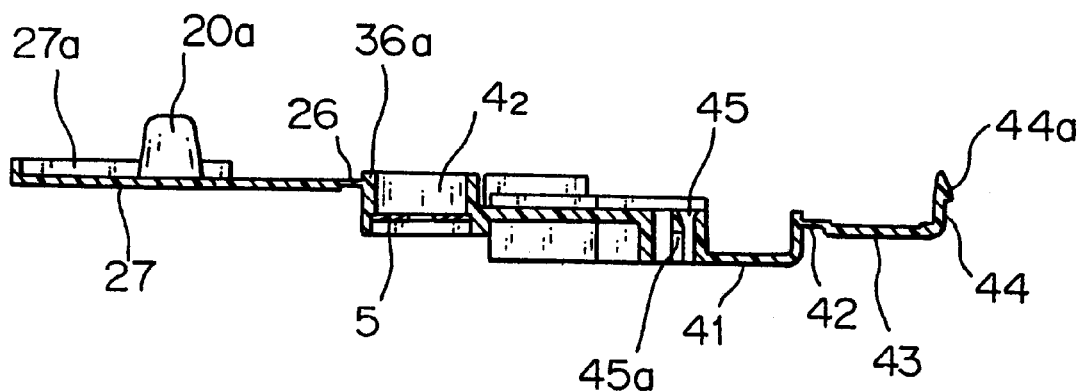
FIG. 10 is an enlarged sectional view taken along the line B—B of FIG. 5.

After completion of the plastics molding, the signal line 32 connected to each terminal 28 is pulled out of the cutout 37a, bent along the longitudinal edge of the base plate 25, and received in the protector trough 41, followed by closing the cover 43, at which time the lock piece 44 is inserted into the corresponding lock hole 45 to bring the lock projection 44a into locking engagement with the lock groove 45a (FIG. 10).

A fuse 48 (FIG. 14), for example, is placed from above in each circuit protector element mount frame 37, and its not-shown leads are inserted in the lead insertion holes 30b, 30b of the circuit protector element connecting portion 30 to be soldered by an auto solder method or the like. The link piece 30a is thereafter cut to connect the circuit protector element to the terminal 28.

The pair of battery-connecting plates 16, 15 are assembled to the front and the rear of the battery assembly 50 by screwing in the same manner as shown in FIG. 20.

To assemble the front battery-connecting plate 16, the reference hole 6s of each section 16A, 16B, 16C, as in the case of FIG. 1, is first fitted on the corresponding rectangular battery electrode 52 or 53. By this, the remaining holes 6 other than the reference holes 6s are automatically fitted on their corresponding rectangular battery electrodes 52 and 53, after which are screwed the bolts to fasten the plate 16 to the battery assembly 50. Likewise, the rear battery-connecting plate 15 is also fastened by screwing. In this instance, if there is a pitch deviation between each reference hole 6s, such a deviation, as in the preceding examples, is absorbed by the pitch adjusting means 7.

Figure 14:
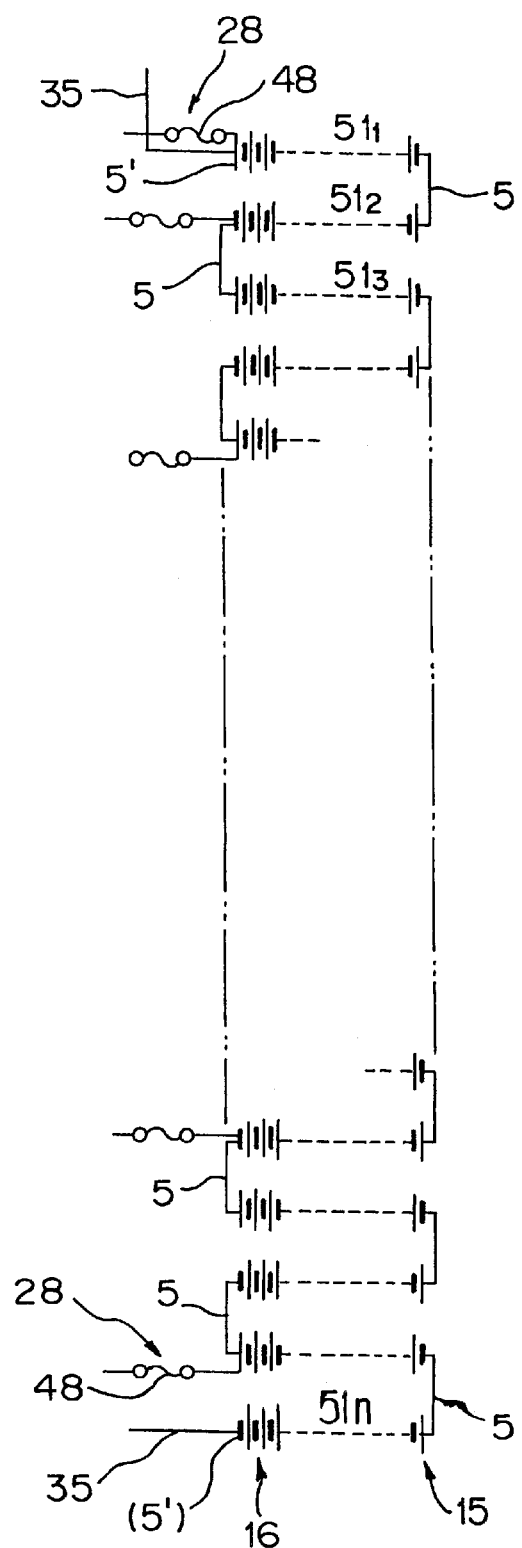
FIG. 14 is a circuit diagram of batteries placed in a connected condition with the battery-connecting plates of FIGS. 4 and 5.

The rectangular batteries $51_1$, $51_2$ ... $51n$ of the battery assembly 50 are thus connected in series by the battery-connecting plates 15, 16 as shown in FIG. 14.

In FIG. 6 showing the front battery-connecting plate 16, the power lines 35 from the round terminals 34 (only one is shown in this figure) connecting via the outermost connection portions $3_2'$ to the related batteries 51 are fitted in the respective wiring guide grooves 40 of the base plate 25 to be held. A set of three wiring guide grooves 40 is provided for each section 16A, 16B, 16C as shown, and hence, power lines such as a power line leading to the battery assembly 50, a grounding line and a charging line as from a distributor can be neatly wired and held.

The signal lines 32 (only one is shown in this figure), which are received in the protector trough 41, connect to a not-shown ECU. The voltage detecting terminals 28, each with an interposed fuse 48, are connected, along with the busbars 5', 5, to the connection portions $3_2'$ at both ends of the battery-connecting plate 16 and to the intermediate connection portions 32, one for one connection portion with two holes 6 and thus for two electrodes 52, 53, and hence the voltage can be checked for every rectangular battery 51 in groups of two batteries. Therefore, in case of an abnormal voltage, batteries can be replaced in units of two batteries.

The power lines 35 and the signal lines 32 can be wired in a vertically spaced manner by the wiring guide grooves 40 and the protector trough 41.

Further, the nut or head of a bolt (not shown) tightened to fasten the busbar 5, 5' in each connection portion $3_2$, $3_2'$ of the battery-connecting plate 16 is located inside the related circular window frame 36a, 36b, 36c projecting on the front surface of the plate 25, and thus the risk of a short with other components is reduced. On closing the cover 27 at each section 16A, 16B, 16C, the resilient lock arm 21 enters the lock hole 22 to bring the lock projection 21d into locking engagement with the detent 22d (FIG. 7), thereby to fully shut off and insulate from the outside and provide a safe battery assembly.

To open the cover 27, the resilient piece 21c of the resilient lock arm 21 needs to be deflected toward the support piece 21a with, for example, the tip end of a driver and released from the above locking. Accordingly, the cover will not open as by vibrations during running of the automobile and is reliable. In the above unlocked condition, the cover 27 can be easily opened by fingering at the cutout 47 provided at its intermediate portion.

Figure 16:
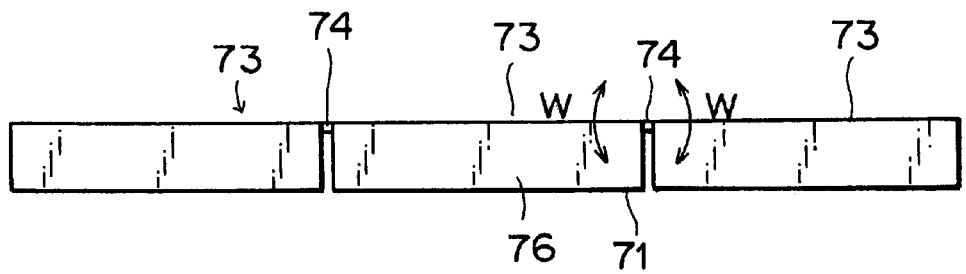
FIG. 16 is a side view of an essential portion of the battery-connecting plate of FIG. 15.
Figure 17:
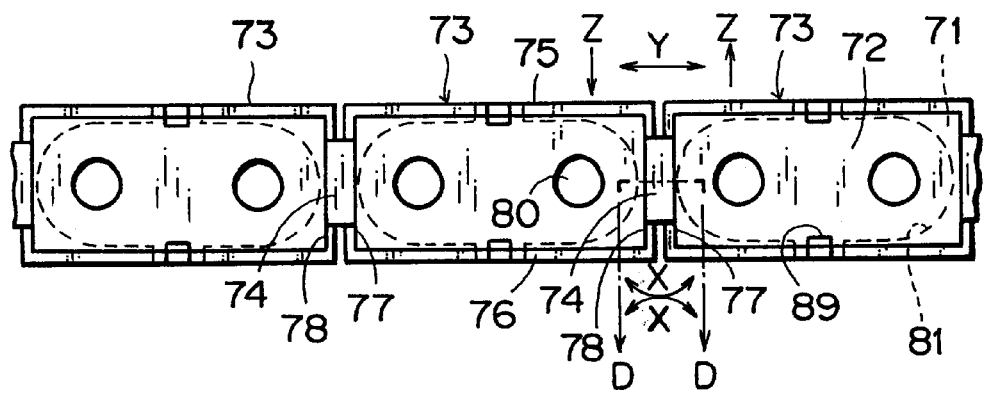
FIG. 17 is a plan view of the essential portion of the battery-connecting plate of FIG. 16.
Figure 18:
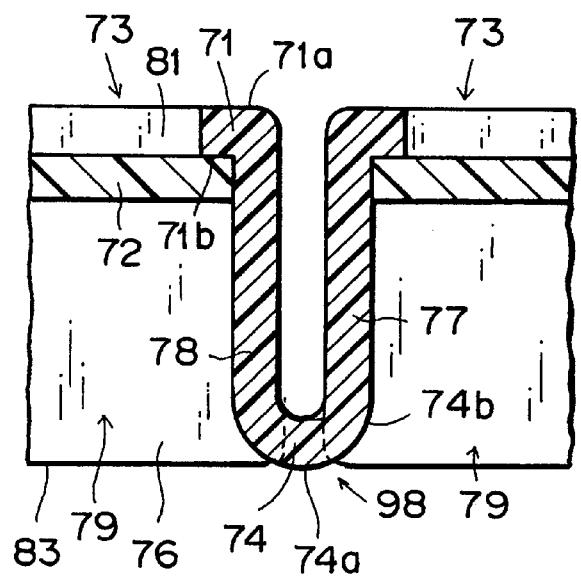
FIG. 18 is an enlarged sectional view taken along the line D–D of FIG. 17.

FIG. 15 is a general perspective view of a battery-connecting plate of a fourth embodiment according to this invention; FIG. 16 is a side view of an essential portion of the battery-connecting plate; FIG. 17 is a plan view of same; and FIG. 18 is a section along the line D—D of FIG. 17.

This battery-connecting plate 70 includes a base plate 71 of synthetic resin made up of a plurality of subdivided base plates 71' for respective busbars 72. A connection portion 73 is independently formed at each subdivided base plate 71'. Neighboring connection portions 73 are linked by a thin hinge-like resilient portion 74.

Base plates 71' each has upstanding walls 75–78 at four sides thereof (at the front, rear, left and right) to provide a longitudinal row of box-like busbar-receiving portions 79. A conductive-metal made rectangular busbar 72 with two holes 80 is placed in each busbar-receiving portion 79 to form the connection portion 73. Each base plate 71' has an opening 81 (FIG. 17).

Adjacent minor walls 77, 78 of neighboring busbar receiving portions 79 extend perpendicularly to the longitudinal direction of the battery-connecting plate 70 and are of smaller height than the major walls 75, 76. The hinge-like resilient portion 74 is formed integrally at the tip ends of the minor walls 77, 78 to link the neighboring busbar receiving portions 79. The adjacent minor walls 77, 78 of neighboring busbar-receiving portions 79 and the resilient portion 74 bridging the minor walls 77, 78 at their tip ends constitute a pitch adjusting means 98.

The resilient portion 74 is arcuately bent as shown in FIG. 18 and has its tip end 74a located at the same height as that of the major walls 75, 76. The skirts 74b of the resilient portion 74 are of the same width as and integrally continuous to the related minor walls 77, 78. The resilient portion 74, as shown in FIG. 17, has a smaller length than that of the minor walls 77, 78 to provide rectangular cutouts 82 (FIG. 15) at opposite lengthwise ends of the resilient portion 74.

Each battery of the battery assembly (not shown) has its male thread electrode passed via the opening 81 of the related base plate 71' through the hole 80 of the busbar 72 located inside the busbar receiving portion 79 and tightened with a nut (not shown) inside the space of the busbar receiving portion 79, and is joined to the rear surface 71a (FIG. 18) of the related base plate 71' (the surface opposite the busbar-mounting surface 71b). The deviation in position between the electrodes and the busbar holes 80 is absorbed by the resilient portion 74 for each battery.

The hinge-like resilient portion 74 is located at the open side 83 of the busbar-receiving portions 79 opposite the base plate 71 on the rear surface 71a of which is mounted the battery assembly. The resilient portion 74 is remote from the battery assembly by a distance substantially as large as the height dimension of the busbar receiving portion 79 and projects arcuately in the direction opposite the battery assembly. Therefore, the resilient portion 74 can be bent with an improved directional freedom and efficiently absorbs the deviation at least in biaxial directions.

The resilient portion 74 enables, for example, twisting of the related connection portions 73 in the direction of an arrow V in FIG. 15, vertical bending (rotation) in the direction of an arrow W in FIG. 16, horizontal bending (swinging) in the direction of an arrow X in this figure, expansion and contraction in the direction of an arrow Y, and is hearing in the direction of an arrow z to securely absorb the positional deviation in each direction.

Figure 19:
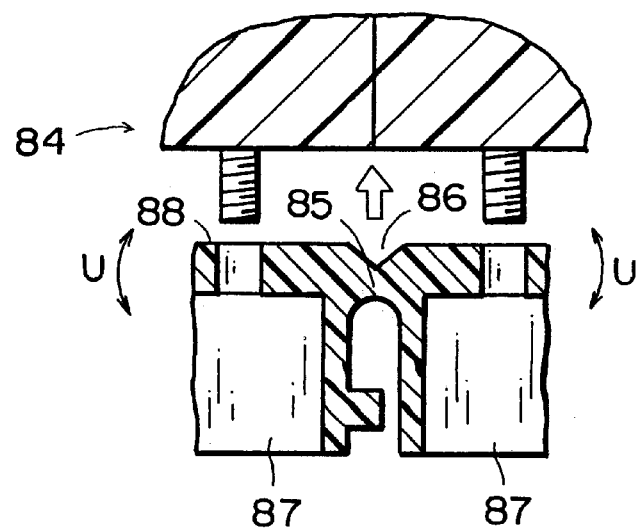
FIG. 19 is a partial sectional view of a comparative example for comparison with the battery-connecting plate of FIG. 15.

As will be apparent from a comparative example as shown in FIG. 19, if base plates 88 of busbar receiving portions 87 are linked at the side toward the battery assembly 84 by a resilient portion 85 formed with a substantially V-shaped cutout, a positional deviation can be absorbed only in the bending direction of an arrow U, i.e., in a uniaxial direction. Further, the bending amount of the busbar receiving portions 87 will be limited due to the toughness of resin material, and the size of the cutout 86 will be also limited, resulting in a small positional deviation absorption. Further, to form the V-shaped cutout 86, the molding tool (not shown) needs to be provided with a tip, resulting in a poor workability of the tool. In addition, there is apprehension that a crack may be caused to extend from the V-shaped cutout 86 in the resilient portion 85.

In contrast, in the battery-connecting plate 70 of the present embodiment, because the resilient portion 74, as described above, is located at the side opposite and remotely from the base plate 71 and is formed arcuate, it can be bent in various directions to absorb a positional deviation. Further, the molding tool (not shown) which molds the arcuate resilient form 74 is more easily workable than the molding tool (not shown) which molds the resilient portion 85 with a V-shaped cutout as in FIG. 19, thereby leading to a reduction in the molding tool cost. In addition, the arcuate resilient portion 74 has a good stress scattering property, and is less subject to damage under a repeated or long-term use.

As shown by dotted lines in FIG. 17, each subdivided base plate which supports a busbar has an oval opening 81 inside which the two holes 80 of the busbar 72 are located. Because the positional deviation is absorbed by the resilient portion 74 for each connection portion 73, the inner diameter of the busbar holes 80 may be made substantially the same as the outer diameter of the not-shown male thread electrodes (slightly larger, to be exact), so that by use of the small holes 80, a wider contact area between the electrode and the busbar busbar 72 is attained, leading to an improved reliability in electrical connection.

The busbar 72 is fixed in each busbar receiving portion 79 with lock claws 89 (FIG. 17) which project inwardly from the major walls 75, 76 of the busbar receiving portion 79 as shown in FIG. 15. A cover 90 is rotatably attached via hinges 91 to the major walls 76 at one side of the busbar receiving portions 79, and at the other major walls 75 is provided a positioning frame 92 for the busbar receiving portions 79. The vertical wall 93 at the front end of the cover is provided with lock pieces 94, and the frame 92 is provided with lock projections 95 engageable with the lock pieces 94.

The hinges 91, which are provided at each busbar receiving portion 79 or connection portion 73, are thin-walled and somewhat elongate, so as to be deformable with movement of the connection portions 73 at the time of absorbing a positional deviation. It is thus precluded that the cover 90 interferes with absorbing the positional deviation.

The frames 92 are provided for each busbar receiving portion 79 and do not interfere with movement of the busbar-receiving portions 79 at the time of absorbing the positional deviation. Because the lock projections 95 engageable with the cover 90 are not provided on busbar-receiving portions 97, but on outer frames 92, the positional deviation absorbing effect of the resilient portions 74 will not be spoiled on closing the cover.

The above structure prevents a strong stress from being applied to the electrodes and busbars 72 after completion of their assembly. This stress is also alleviated by the resilient portions 74. Incidentally, needless to say, also in a battery-connecting plate with no frames 92 and no cover 90 such as that shown in FIG. 17, the resilient portions 74 show a noticeable positional deviation absorbing effect. The outermost busbar receiving portions 79 have on their major walls 76 positioning projections 97 which advance in corresponding cutouts 96 provided in the cover 90, whereby to secure positioning of the cover at the time of its rotation.

Having now fully described the invention, it will be apparent to one of ordinary skill in the art that many changes and modifications can be made thereto without departing from the spirit and scope of the invention as set forth herein.

What is claimed is:

1. A battery-connecting plate for connecting batteries in series, said batteries, each with a positive and a negative electrodes at opposite ends thereof, being assembled in a row arrangement with said positive and negative electrodes reversed in an alternating manner, comprising:

a base plate of synthetic resin;

connection portions each having a busbar provided on said base plate, said busbar having a predetermined number of holes for passing therethrough of a corresponding number of said positive and negative electrodes for connection with said busbar; and a pitch adjusting means provided on said base plate at every predetermined number of said connection portions for adjusting a deviation in position between said electrodes and said holes of said busbars.

2. The battery-connecting plate according to claim 1, wherein said pitch adjusting means comprises a slit provided in said base plate, said slit opening at one end thereof to one longitudinally-extending edge of said base plate, an escape hole provided in said base plate at the other end of said slit, and a resilient portion formed by that part of said base plate located at a side of said escape hole opposite said slit.

3. The battery-connecting plate according to claim 1, wherein said pitch adjusting means comprises a slit provided in said base plate to separate it into sections and a pair of hinges linking said sections at opposite longitudinally-extending edges of said base plate.

4. The battery-connecting plate according to claim 1, wherein said base plate comprises a row of subdivided base plates, said connection portions are each formed at a respective one of said subdivided base plates, and said pitch adjusting means is provided at every one of said connection portions and comprises a resilient hinge linking neighboring ones of said row of subdivided base plates.

5. The battery-connecting plate according to claim 4, wherein said resilient hinge is located at a side opposite said batteries and apart from said base plate.

6. The battery-connecting plate according to claim 1, wherein said connection portions comprise first connection portions each having as said busbar a first busbar having two said holes and a second connection portion having as said busbar a second busbar having one said hole, said second connection portion being located on one side or opposite sides of said first connection portions.

7. The battery-connecting plate according to claim 1 or 6, wherein said connection portions each further comprises a window provided in said base plate in which said respective busbar is fixedly mounted.

8. The battery-connecting plate according to claim 7, wherein said respective busbar is fixedly mounted in said window by insert molding.

9. The battery-connecting plate according to claim 1 or 6, further comprising a voltage detecting terminal attached with a signal line, connected to one or more desired ones of said busbars.

10. The battery-connecting plate according to claim 9, further comprising a protector trough for said signal line, said protector trough being integrally provided at a side of said base plate where said voltage detecting terminal is connected to said one or more desired ones of said busbars.

11. The battery-connecting plate according to claim 9, further comprising a power line connected to one or more of said busbars and a wiring guide groove for said power line, said wiring guide groove being integrally provided at a side of said base plate where said voltage detecting terminal is connected to said one or more desired ones of said busbars.

12. The battery-connecting plate according to claim 1, further comprising an open/close cover integrally provided via a hinge at each section of said base plate divided by said pitch adjusting means.

13. The battery-connecting plate according to claim 12, further comprising lock means with which said cover is maintained in closed condition at said each section of said base plate.

* * * * *